US006192681B1

(12) United States Patent
Tsuruga et al.

(10) Patent No.: US 6,192,681 B1
(45) Date of Patent: Feb. 27, 2001

(54) HYDRAULIC DRIVE APPARATUS

(75) Inventors: Yasutaka Tsuruga, Ryugasaki; Takashi Kanai, Kashiwa; Junya Kawamoto, Tsuchiura, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/077,552

(22) PCT Filed: Nov. 14, 1997

(86) PCT No.: PCT/JP97/04154

§ 371 Date: Jun. 1, 1998

§ 102(e) Date: Jun. 1, 1998

(87) PCT Pub. No.: WO98/22717

PCT Pub. Date: May 28, 1998

(30) Foreign Application Priority Data

Nov. 21, 1996 (JP) .................................................... 8-310850

(51) Int. Cl.[7] ...................................................... F16D 31/02

(52) U.S. Cl. ................................. 60/447; 60/452; 60/468

(58) Field of Search ............................. 60/447, 449, 452, 60/468

(56) References Cited

U.S. PATENT DOCUMENTS 4,617,854 10/1986 Kropp .
5,129,230 * 7/1992 Izumi et al. ........................... 60/452
5,226,800 * 7/1993 Morino .................................. 60/452
5,285,642 2/1994 Watanabe et al. .

FOREIGN PATENT DOCUMENTS 27 54 430 6/1979 (DE) .
33 21 483 12/1984 (DE) .
462589 12/1991 (EP) .
597109 5/1994 (EP) .
681106 8/1995 (EP) .
1 599 233 9/1981 (GB) .
60-11706 1/1985 (JP) .
4-136509 5/1992 (JP) .
4-258508 9/1992 (JP) .
4-119604 10/1992 (JP) .
5-33775 2/1993 (JP) .
5-33776 2/1993 (JP) .
5-99126 4/1993 (JP) .
5-187411 7/1993 (JP) .
6-221305 8/1994 (JP) .
2526440 11/1996 (JP) .
2592561 12/1996 (JP) .
WO92/06306 4/1992 (WO) .

* cited by examiner

*Primary Examiner*—F. Daniel Lopez
(74) *Attorney, Agent, or Firm*—Mattingly, Stanger & Malur

(57) ABSTRACT

A differential pressure ΔPLS between a delivery pressure of a hydraulic pump 2 and a maximum load pressure among a plurality of actuators **3*a*–3*c* is maintained at a target differential pressure ΔPLSref by pump displacement control means 5. The target differential pressure ΔPLSref is modified depending on an engine rotational speed by introducing a differential pressure ΔPp across a throttle 50 disposed in a delivery line of a fixed pump 30. An unloading valve 80 has first and second auxiliary control pressure chambers 80*e*, 80*f* to which the differential pressure p across the throttle 50 is introduced, and a target differential pressure ΔPun of the unloading valve is also modified in match with change in the target differential pressure ΔPLSref modified by the operation driver 32**. Stable load sensing control is thereby achieved without being affected by the engine rotational speed.

6 Claims, 12 Drawing Sheets

HYDRAULIC DRIVE APPARATUS

TECHNICAL FIELD

The present invention relates to a hydraulic drive system, and more particularly to a hydraulic drive system operating under load sensing control to control the displacement of a hydraulic pump so that a differential pressure between a delivery pressure of the hydraulic pump and a maximum load pressure among a plurality of actuators is maintained at a setting value.

BACKGROUND ART

As to the load sensing control technique for controlling the displacement of a hydraulic pump so that a differential pressure between a delivery pressure of the hydraulic pump and a maximum load pressure among a plurality of actuators is maintained at a setting value, there are known a pump displacement control system disclosed in JP, A, 5-99126 and a control system for a variable displacement hydraulic pump disclosed in GB Patent 1599233.

The pump displacement control system disclosed in JP, A, 5-99126 comprises a servo piston for tilting a swash plate of a variable displacement hydraulic pump, and a tilting control unit for supplying a pump delivery pressure to the servo piston in accordance with a differential pressure ΔPLS between a delivery pressure Ps of the hydraulic pump and a load pressure PLS of an actuator driven by the hydraulic pump so as to maintain the differential pressure ΔPLS at a setting value ΔPLSref, thereby controlling the pump displacement. The disclosed pump displacement control system further comprises a fixed displacement hydraulic pump driven by an engine along with the variable displacement hydraulic pump, a throttle disposed in a delivery line of the fixed displacement hydraulic pump, and setting modifying means for modifying the setting value ΔPLSref of the tilting control unit in accordance with a differential pressure ΔPp across the throttle. The setting value ΔPLSref of the tilting control unit is modified by detecting an engine rotational speed based on change in the differential pressure across the throttle disposed in the delivery line of the fixed displacement hydraulic pump.

The control system disclosed in GB Patent 1599233 also has a similar construction. More specifically, a throttle is provided in a delivery line of a fixed pump and a differential pressure ΔPp across the throttle is introduced to control pressure chambers at opposite ends of a setting adjust valve. When the rotational speed of a prime mover is sufficiently high and the differential pressure ΔPp is larger than the pressure set by a spring, a valve apparatus 21 establishes communication with the II side and a target load-sensing differential pressure ΔPLSref of a tilting control valve involved in load sensing control is set to a relatively high value. When the prime mover comes into an overload condition and its rotational speed lowers upon change in loads of actuators connected respectively to a plurality of flow control valves, a delivery rate of the fixed pump connected to the prime mover is reduced. If the setting value of the spring becomes higher than the differential pressure ΔPp across the throttle upon reduction in the pump delivery rate, the setting adjust valve is shifted to establish communication with the I side and the target load-sensing differential pressure ΔPLSref of the tilting control valve involved in load sensing control is set to a relatively low value, thereby relieving a load imposed on the prime mover.

DISCLOSURE OF THE INVENTION

In the pump displacement control system disclosed in JP, A, 5-99126, when flow control valves are operated, the load sensing differential pressure ΔPLSref corresponding to the engine rotational speed is set in the tilting control unit by the setting modifying means, and the pressure Ps in a pump delivery line of the variable displacement hydraulic pump is held at a pressure higher than a maximum load pressure PLS among the actuators operated by the flow control valves by the load sensing differential pressure ΔPLSref, i.e., Ps=PLS+ΔPLSref.

On the other hand, when no flow control valves are operated, the maximum load pressure PLS is given by a reservoir pressure and hence the tilting control unit minimizes a tilting angle of the variable displacement hydraulic pump for lowering the pressure in the pump delivery line. In this condition, there produces a small pump delivery rate, or even if the setting is made to null out the pump delivery rate, a small flow rate still produces due to a delay in operation of the swash plate of the hydraulic pump. This brings a hydraulic fluid into an enclosed state because of all the flow control valves being in neutral positions, thus developing a pressure in the pump delivery line.

In a general hydraulic circuit, therefore, a safety valve (relief valve) is connected to the pump delivery line for limiting the pressure in the pump delivery line to a maximum pressure value allowable in the entire circuit.

Further, in a hydraulic system operating under load sensing control, an unloading valve is generally connected to a pump delivery line for the purpose of improving energy efficiency of a hydraulic pump in its non-load condition. The unloading valve controls the pressure in the pump delivery line to be held higher than a maximum load pressure PLS by a differential pressure ΔPun set by a spring when no flow control valves are operated.

The setting differential pressure ΔPun of the unloading valve is set to a higher value than the load sensing differential pressure ΔPLSref set in the tilting control unit. Accordingly, when flow control valves are operated, the pressure Ps in the pump delivery line is controlled by the tilting control unit to meet Ps=PLS+ΔPLSref under a condition where the system is normally operating. Thus the unloading valve does not operate to avoid interference with the load sensing control effected by the tilting control unit.

When the maximum load pressure PLS varies upon a variation in working load, the pressure Ps in the delivery line of the hydraulic pump is also adjusted by the tilting control unit following such a variation. Due to a delay in pump tilting under the load sensing control, however, there may produce a flow rate more than demanded by actuators. A resulting flow rate difference deviates the pressure in the delivery line from the target pressure in the load sensing control, causing an oscillation in the entire system.

The unloading valve operates to stabilize the system against such an oscillation phenomenon by releasing the hydraulic fluid in the pump delivery line when the pressure in the pump delivery line exceeds the setting differential pressure ΔPun. This is equivalent to that the hydraulic fluid corresponding to a flow rate produced due to a delay in tilting of the hydraulic pump is released. As a result, the entire system is stabilized.

By setting both values of the setting differential pressure ΔPun of the unloading valve and the setting differential pressure ΔPLSref for load sensing control close to each other, stability of the entire system is improved.

Moreover, in the pump displacement control system disclosed in JP, A, 5-99126, the setting modifying means detects the engine rotational speed based on the delivery rate of the fixed displacement pump and variably adjusts the setting differential pressure ΔPLSref for load sensing control, thereby realizing an improvement of operability depending on the engine rotational speed. Supposing a system that an unloading valve is provided in a hydraulic circuit including the disclosed pump displacement control system and the setting differential pressure ΔPun of the unloading valve is set slightly higher than the load-sensing setting differential pressure ΔPLSref at the rated rotational speed of an engine, such a system can improve stability of the entire system at the rated rotational speed of the engine. However, when the engine rotational speed is lowered, the load-sensing setting differential pressure ΔPLSref is reduced, whereas the setting differential pressure of the unloading valve remains fixed by being set by a spring. Accordingly, a difference between the load-sensing setting differential pressure ΔPLSref and the setting differential pressure ΔPun of the unloading valve is increased and stability comparable to that achieved at the rated rotational speed of the engine cannot be maintained.

The control system disclosed in GB Patent 1599233 also has a similar problem. Specifically, supposing a system that an unloading valve is provided and the setting differential pressure ΔPun of the unloading valve is set slightly higher than the load-sensing setting differential pressure ΔPLSref at the rated rotational speed of a prime mover, such a system cannot maintain its stability when the rotational speed of the prime mover is lowered.

An object of the present invention is to provide a hydraulic drive system with which stable load sensing control can be performed without being affected by an engine rotational speed.

Features of the present invention to achieve the above object and other associated features are as follows.

(1) To begin with, according to the present invention, there is provided a hydraulic drive system comprising an engine, a variable displacement hydraulic pump driven by the engine, a plurality of actuators driven by a hydraulic fluid delivered from the hydraulic pump, a plurality of flow control valves for controlling flow rates of the hydraulic fluid supplied from the hydraulic pump to a plurality of actuators, and pump displacement control means for controlling the displacement of the hydraulic pump so that a differential pressure ΔPLS between a delivery pressure Ps of the hydraulic pump and a maximum load pressure PLS among the plurality of actuators is maintained at a first setting value ΔPLSref, the pump displacement control means including first setting modifying means for modifying the first setting value ΔPLSref of the pump displacement control means depending on a rotational speed of the engine, wherein the hydraulic drive system further comprises: an unloading valve for controlling the delivery pressure Ps of the hydraulic pump so that the differential pressure ΔPLS between the delivery pressure of the hydraulic pump and the maximum load pressure PLS among the plurality of actuators is maintained at a second setting value ΔPun higher than the first setting value ΔPLSref, and second setting modifying means for modifying the second setting value ΔPun of the unloading valve depending on the rotational speed of the engine in match with change in the first setting value ΔPLSref modified by the first setting modifying means.

In the present invention thus constructed, when the first setting value ΔPLSref of the pump displacement control means is modified by the first setting modifying means depending on the engine rotational speed, the second setting modifying means modifies the second setting value ΔPun of the unloading valve in match with change in the first setting value ΔPLSref. Therefore, a difference between the first setting value ΔPLSref of the pump displacement control means and the second setting value ΔPun of the unloading valve is not increased when the engine rotational speed is lowered, and hence stability of the system can be ensured even at low rotational speeds of the engine.

(2) In the above (1), preferably, the first setting modifying means comprises a fixed displacement hydraulic pump driven by the engine along with the variable displacement hydraulic pump, a flow rate detecting valve disposed in a delivery line of the fixed displacement hydraulic pump, and an operation driver for modifying the first setting value ΔPLSref depending on a differential pressure ΔPp across the flow rate detecting valve, and the second setting modifying means includes control pressure chambers for modifying the second setting value ΔPun of the unloading valve depending on the differential pressure ΔPp across the flow rate detecting valve.

By so constructing the first and second setting modifying means, since the differential pressure ΔPp across the flow rate detecting valve varies depending on the engine rotational speed, the first setting modifying means can modify the first setting value ΔPLSref depending on the engine rotational speed by modifying the first setting value ΔPLSref in accordance with the differential pressure ΔPp across the flow rate detecting valve, and the second setting modifying means can modify the second setting value ΔPun of the unloading valve depending on the engine rotational speed by modifying the second setting value ΔPun in accordance with the differential pressure ΔPp across the flow rate detecting valve, whereby the second setting value ΔPun of the unloading valve can be modified in match with change in the first setting value ΔPLSref modified by the first setting modifying means. Also, since change in the engine rotational speed is hydraulically detected based on the differential pressure ΔPp across the flow rate detecting valve, the system can be constructed in hydraulic fashion.

(3) In the above (1), preferably, the first setting modifying means detects the rotational speed of the engine and, when the detected engine rotational speed is in a region including the lowest rotational speed of the engine, modifies the first setting value ΔPLSref of the pump displacement control means so that a total maximum flow rate Qvtotal of the plurality of flow control valves passing respective flow rates expressed by the products of the differential pressure ΔPLS and respective opening areas of the plurality of flow control valves is smaller than a maximum delivery rate Qsmax of the hydraulic pump corresponding to the engine rotational speed at that time, and the second setting modifying means modifies the second setting value ΔPun of the unloading valve in match with change in the first setting value ΔPLSref.

By so constructing the first setting modifying means to adjust the relationship between the total maximum demanded flow rate Qvtotal of the plurality of flow control valves and the maximum delivery rate Qsmax of the hydraulic pump, the total maximum demanded flow rate of the plurality of flow control valves is greater than the maximum delivery rate of the hydraulic pump and the system is under a condition giving rise to saturation when the engine rotational speed is set to the rated rotational speed suitable for ordinary work, but when the engine rotational speed is set to a low value, the total maximum demanded flow rate of the plurality of flow control valves is reduced to become smaller than the maximum delivery rate of the hydraulic pump and hence no saturation occurs. Accordingly, a change gradient of the flow rate passing through the plurality of flow control valves with respect to a total lever input amount applied to those flow control valves is so reduced as to ensure a wide metering effective area, and good operability can be realized by using the wide metering effective area.

Also, since the second setting modifying means modifies the second setting value ΔPun of the unloading valve in match with change in the first setting value ΔPLSref, the difference between the first setting value ΔPLSref of the pump displacement control means and the second setting value ΔPun of the unloading valve is not increased at any engine rotational speed regardless of change in characteristic of the first setting modifying means and hence stability of the system can be always ensured.

(4) In the above (1), the first setting modifying means comprises a fixed displacement hydraulic pump driven by the engine along with the variable displacement hydraulic pump, a flow rate detecting valve disposed in a delivery line of the fixed displacement hydraulic pump, and an operation driver for modifying the first setting value ΔPLSref depending on a differential pressure ΔPp across the flow rate detecting valve, the flow rate detecting valve being constructed to have a larger opening area when the engine rotational speed is in the region including the rated rotational speed than when the engine rotational speed is in a region including the lowest rotational speed, and the second setting modifying means includes control pressure chambers for modifying the second setting value ΔPun of the unloading valve depending on the differential pressure ΔPp across the flow rate detecting valve.

With that feature, the first setting modifying means can realize the function of the above (3) (i.e., the function of detecting the rotational speed of the engine and, when the detected engine rotational speed is in the region including the lowest rotational speed of the engine, modifying the setting value ΔPLSref of the pump displacement control means so that the total maximum flow rate Qvtotal of the flow control valves is smaller than the maximum delivery rate Qsmax of the hydraulic pump) by using hydraulic arrangement, and the second setting modifying means can realize the function of the above (3) (i.e., the function of preventing the difference between the first setting value ΔPLSref of the pump displacement control means and the second setting value ΔPun of the unloading valve from increasing at any engine rotational speed) by using hydraulic arrangement.

(5) In the above (2) or (4), preferably, the first setting modifying means further comprises a first pressure control valve for generating a signal pressure corresponding to the differential pressure ΔPp across the flow rate detecting valve, the operation driver modifies the setting value ΔPLSref in accordance with the signal pressure from the first pressure control valve, and the control pressure chambers of the unloading valve modifies the second setting value ΔPun in accordance with the signal pressure from the first pressure control valve.

With that feature, since the signal pressure can be introduced from the flow rate detecting valve to each of the operation driver and the unloading valve via a single pilot line, the circuit configuration is simplified. In addition, since the signal pressure is produced at a lower level, the pilot line can be formed of a hose or the like adapted for relatively low pressures, resulting in a reduced cost.

(6) In the above (5), preferably, the hydraulic drive system further comprises a second pressure control valve for generating a signal pressure corresponding to the differential pressure ΔPLS between the delivery pressure Ps of the hydraulic pump and the maximum load pressure PLS among the plurality of actuators, and the unloading valve has a first control pressure chamber applying a hydraulic pressure force to act in the direction to open the unloading valve and a second control pressure chamber applying a hydraulic pressure force to act in the direction to close the unloading valve, the signal pressure output from the second pressure control valve being introduced to the first control pressure chamber, the signal pressure output from the first pressure control valve being introduced to the second control pressure chamber.

With that feature, the unloading valve can introduce the signal pressure corresponding to the differential pressure ΔPLS between the pump delivery pressure Ps and the maximum load pressure PLS via a single pilot line adapted for relatively low pressures, resulting in that the circuit configuration is more simplified and less expensive.

BEST MODE FOR CARRYING OUT THE INVENTION

Hereunder, embodiments of the present invention will be described with reference to the drawings.

Figure 1:
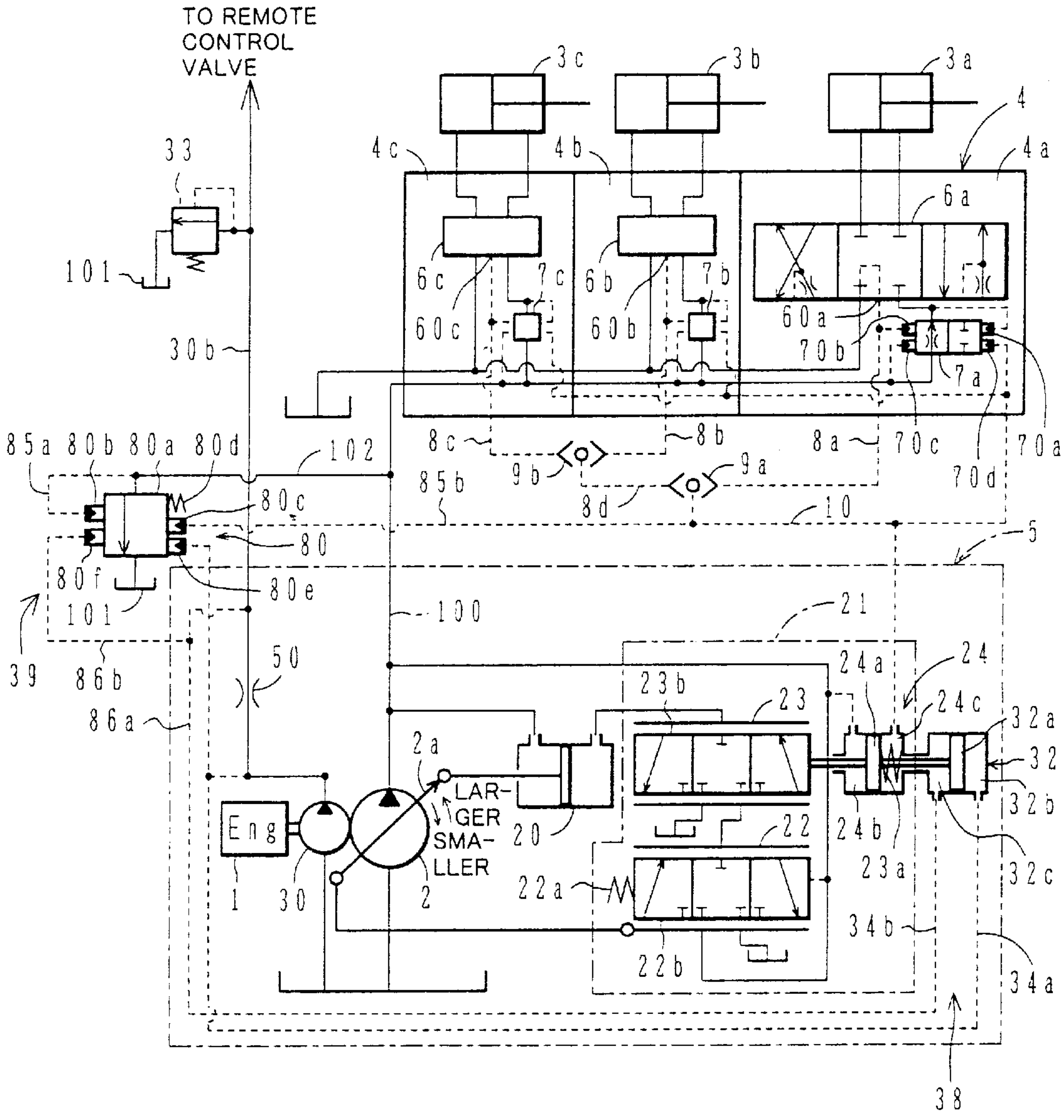
FIG. 1 is a hydraulic circuit diagram showing the configuration of a hydraulic drive system according to a first embodiment of the present invention.

FIG. 1 shows a hydraulic drive system according to a first embodiment of the present invention. The hydraulic drive system comprises an engine 1, a variable displacement hydraulic pump 2 driven by the engine 1, a plurality of actuators 3*a,* 3*b,* 3*c* driven by a hydraulic fluid delivered from the hydraulic pump 2, a valve apparatus 4 including a plurality of directional control valves 4*a,* 4*b,* 4*c* connected to a delivery line 100 of the hydraulic pump 2 for controlling flow rates and directions at and in which the hydraulic fluid is supplied from the hydraulic pump 2 to the respective actuators 3*a,* 3*b,* 3*c,* and a pump displacement control system 5 for controlling the displacement of the hydraulic pump 2, and an unloading valve 80 disposed in a branch line 102 communicating the delivery line 100 of the hydraulic pump 2 with a reservoir 101.

The plurality of directional control valves 4*a,* 4*b,* 4*c* are made up of respectively a plurality of flow control valves 6*a,* 6*b,* 6*c* and a plurality of pressure compensating valves 7*a,* 7*b,* 7*c* for controlling differential pressures across the plurality of flow control valves 6*a,* 6*b,* 6*c* to become equal to each other.

The plurality of pressure compensating valves 7*a,* 7*b,* 7*c* are of the pre-stage type installed upstream of the flow control valves 6*a,* 6*b,* 6*c,* respectively. The pressure compensating valve 7*a* has two pairs of opposing control pressure chambers 70*a,* 70*b;* 70*c,* 70*d.* Pressures upstream and downstream of the flow control valve 6*a* are introduced respectively to the control pressure chambers 70*a,* 70*b,* and a delivery pressure Ps of the hydraulic pump 2 and a maximum load pressure PLS among the plurality of actuators 3*a,* 3*b,* 3*c* are introduced respectively to the control pressure chambers 70*c,* 70*d,* whereby the differential pressure across the flow control valve 6*a* acts in the valve-closing direction and a differential pressure ΔPLS between the delivery pressure Ps of the hydraulic pump 2 and the maximum load pressure PLS among the plurality of actuators 3*a,* 3*b,* 3*c* acts in the valve-opening direction. Thus the pressure compensating valve 7*a* controls the differential pressure across the flow control valve 6*a* with the differential pressure ΔPLS as a target differential pressure for pressure compensation. The pressure compensating valves 7*b,* 7*c* are also of the same construction.

Since the pressure compensating valves 7*a,* 7*b,* 7*c* control the respective differential pressures across the flow control valves 6*a,* 6*b,* 6*c* with the same differential pressure ΔPLS as a target differential pressure, the differential pressures across the flow control valves 6*a,* 6*b,* 6*c* are all controlled to become equal to the differential pressure ΔPLS and respective flow rates demanded by the flow control valves 6*a,* 6*b,* 6*c* are expressed by the products of the differential pressure ΔPLS and opening areas of those valves.

The plurality of flow control valves 6*a,* 6*b,* 6*c* are provided with load ports 60*a,* 60*b,* 60*c,* respectively, through which load pressures of the actuators 3*a,* 3*b,* 3*c* are taken out during the operation of the actuators 3*a,* 3*b,* 3*c.* A maximum one of the load pressures taken out through the load ports 60*a,* 60*b,* 60*c* is detected by a signal line 10 via load lines 8*a,* 8*b,* 8*c,* 8*d* and shuttle valves 9*a,* 9*b,* the detected pressure being applied as the maximum load pressure PLS to the pressure compensating valves 7*a,* 7*b,* 7*c.*

The hydraulic pump 2 is a swash plate pump wherein a delivery rate is increased by increasing a tilting angle of a swash plate 2*a.* The pump displacement control system 5 comprises a servo piston 20 for tilting the swash plate 2*a* of the hydraulic pump 2, and a tilting control unit 21 for driving the servo piston 20 to control the tilting angle of the swash plate 2*a,* thereby controlling the displacement of the hydraulic pump 2. The serve piston 20 is operated in accordance with a pressure introduced from the delivery line 100 (the delivery pressure Ps of the hydraulic pump 2) and a command pressure from the tilting control unit 21. The tilting control unit 21 includes a first tilting control valve 22 and a second tilting control valve 23.

The first tilting control valve 22 is a horsepower control valve for reducing the delivery rate of the hydraulic pump 2 as the pressure introduced from the delivery line 100 (the delivery pressure Ps of the hydraulic pump 2) rises. The first tilting control valve 22 receives the delivery pressure Ps of the hydraulic pump 2, as an original pressure, and if the delivery pressure Ps of the hydraulic pump 2 is lower than a predetermined level set by a spring 22*a,* a spool 22*b* is moved to the right on the drawing, causing the delivery pressure Ps of the hydraulic pump 2 to be output as it is. At this time, if the output pressure is directly applied as a command pressure to the servo piston 20, the servo piston 20 is moved to the left on the drawing due to an area difference thereof between the opposite sides, whereupon the tilting angle of the swash plate 2*a* is increased to increase the delivery rate of the hydraulic pump 2. As a result, the delivery pressure Ps of the hydraulic pump 2 rises. When the delivery pressure Ps of the hydraulic pump 2 exceeds the predetermined level set by the spring 22*a,* the spool 22*b* is moved to the left on the drawing to reduce the delivery pressure Ps and a resulting reduced pressure is output as a command pressure. Accordingly, the servo piston 20 is moved to the right on the drawing, whereupon the tilting angle of the swash plate 2*a* is diminished to reduce the delivery rate Ps of the hydraulic pump 2.

The second tilting control valve 23 is a load sensing control valve for controlling the differential pressure ΔPLS between the delivery pressure Ps of the hydraulic pump 2 and the maximum load pressure PLS among the actuators 3*a,* 3*b,* 3*c* to be maintained at the target differential pressure ΔPLSref. The second tilting control valve 23 comprises a spring 23*a* for setting a basic value of the target differential pressure ΔPLSref, a spool 23*b,* and a first operation driver 24 operated in accordance with the pressure introduced from the delivery line 100 (the delivery pressure Ps of the hydraulic pump 2) and the maximum load pressure PLS among the actuators 3*a,* 3*b,* 3*c,* for thereby moving the spool 23*b.*

The first operation driver 24 comprises a piston 24*a* acting on the spool 23*b* and two hydraulic pressure chambers 24*b,* 24*c* divided by the piston 24*a.* The delivery pressure Ps of the hydraulic pump 2 is introduced to the hydraulic pressure chamber 24*b,* and the maximum load pressure PLS is introduced to the hydraulic pressure chamber 24*c* with the spring 23*a* built in the hydraulic pressure chamber 24*c.*

Further, the second tilting control valve 23 receives the output pressure of the first tilting control valve 22, as an original pressure. When the differential pressure ΔPLS is lower than the target differential pressure ΔPLSref, the spool 23*b* is moved by the first operation driver 24 to the left on the drawing, causing the output pressure of the first tilting control valve 22 to be output as it is. At this time, if the output pressure of the first tilting control valve 22 is given by the delivery pressure Ps of the hydraulic pump 2, the delivery pressure Ps is applied as a command pressure to the servo piston 20. The servo piston 20 is therefore moved to the left on the drawing due to the area difference thereof between the opposite sides, whereupon the tilting angle of the swash plate 2*a* is increased to increase the delivery rate of the hydraulic pump 2. As a result, the delivery pressure Ps of the hydraulic pump 2 rises and the differential pressure ΔPLS also rises. On the other hand, when the differential pressure ΔPLS is higher than the target differential pressure ΔPLSref, the spool 23*b* is moved by the first operation driver 24 to the right on the drawing to reduce the output pressure of the first tilting control valve 22 and a resulting reduced pressure is output as a command pressure. Accordingly, the servo piston 20 is moved to the right on the drawing, whereupon the tilting angle of the swash plate 2*a* is diminished to reduce the delivery rate of the hydraulic pump 2. As a result, the differential pressure ΔPLS is maintained at the target differential pressure ΔPLSref.

Here, the differential pressures across the flow control valves 6*a,* 6*b,* 6*c* are controlled respectively by the pressure compensating valves 7*a,* 7*b,* 7*c* so as to become the same value, i.e., the differential pressure ΔPLS. Therefore, maintaining the differential pressure ΔPLS at the target differential pressure ΔPLSref, as explained above, eventually results in that the differential pressures across the flow control valves 6*a,* 6*b,* 6*c* are maintained at the target differential pressure ΔPLSref.

The pump displacement control system 5 further comprises first setting modifying means 38 for modifying the target differential pressure ΔPLSref applied to the second tilting control valve 23 depending on change in rotational speed of the engine 1. The first setting modifying means 38 is made up of a fixed displacement hydraulic pump 30 driven by the engine 1 along with the variable displacement hydraulic pump 2, a throttle 50 in the form of a flow rate detecting valve disposed intermediate between delivery lines 30*a,* 30*b* of the fixed displacement hydraulic pump 30, and a second operation driver 32 for modifying the target differential pressure ΔPLSref depending on a differential pressure ΔPp across the throttle 50.

The fixed displacement hydraulic pump 30 is one that is usually provided to serve as a pilot hydraulic fluid source. A relief valve 33 for specifying an original pressure supplied from the pilot hydraulic fluid source is connected to the delivery line 30*b,* and the delivery line 30*b* is further connected to a remote control valve (not shown) for producing a pilot pressure used to shift the flow control valves 6*a,* 6*b,* 6*c,* for example.

The second operation driver 32 is an additional operation driver integrated with the first operation driver 24 of the second tilting control valve 23, and comprises a piston 32*a* acting on the piston 24*a* of the first operation driver 24 and two hydraulic pressure chambers 32*b,* 32*c* divided by the piston 32*a*. A pressure upstream of the throttle 50 is introduced to the hydraulic pressure chamber 32*b* via a pilot line 34*a* and a pressure downstream of the throttle 50 is introduced to the hydraulic pressure chamber 32*c* via a pilot line 34*b,* causing the piston 32*a* to urge the piston 24*a* to the left on the drawing by a force corresponding to the differential pressure ΔPp across the throttle 50. The target differential pressure ΔPLSref of the second tilting control valve 23 is set in accordance with the basic value given by the spring 23*a* and the urging force of the piston 32*a.* As the differential pressure ΔPp across the throttle 50 becomes smaller, the piston 32*a* pushes the piston 24*a* by a smaller force to reduce the target differential pressure ΔPLSref. As the differential pressure ΔPp becomes larger, the piston 32*a* pushes the piston 24*a* by a larger force to increase the target differential pressure ΔPLSref.

Here, the differential pressure ΔPp across the throttle 50 varies depending on the rotational speed of the engine 1. The first modifying changing means 38 thus modifies the target differential pressure ΔPLSref of the first tilting control valve 23 depending on the engine rotational speed.

The unloading valve 80 controls the delivery pressure Ps of the hydraulic pump 2 so that the differential pressure ΔPLS between the delivery pressure Ps of the hydraulic pump 2 and the maximum load pressure PLS among the plurality of actuators 3*a,* 3*b,* 3*c* is maintained at a setting differential pressure ΔPun higher than the target differential pressure ΔPLsref for load sensing control (referred to as "load-sensing setting differential pressure" hereinafter). The unloading valve 80 has a first control pressure chamber 80*b* applying pressure to act in the direction to increase an opening degree of a valve body 80*a,* a second control pressure chamber 80*c* applying pressure to act in the direction to reduce the opening degree, a spring 80*d* for urging the valve body 80*a* in the direction to reduce the opening degree, a third control pressure chamber 80*e* applying pressure to act in the direction to reduce the opening degree, and a fourth control pressure chamber 80*f* applying pressure to act in the direction to increase the opening degree. The delivery pressure Ps of the variable displacement hydraulic pump 2 is introduced to the first control pressure chamber 80*b* via a pilot line 85*a,* the maximum load pressure PLS is introduced to the second control pressure chamber 80*c* via a pilot line 85*b,* the pressure upstream of the throttle 50 is introduced to the third control pressure chamber 80*e* via a pilot line 86*a,* and the pressure downstream of the throttle 50 is introduced to the fourth control pressure chamber 80*f* via a pilot line 86*b*.

Here, since the differential pressure ΔPp across the throttle 50 varies depending on the rotational speed of the engine 1, the third and fourth control pressure chambers 80*e,* 80*f* and the pilot lines 86*a,* 86*b* jointly constitute second setting modifying means 39 for changing the setting differential pressure ΔPun of the unloading valve 80 depending on the rotational speed of the engine 1 in match with change in the load-sensing setting differential pressure ΔPLSref of the first setting modifying means 38.

In other words, the unloading valve 80 operates to release the hydraulic fluid in the delivery line 100 to the reservoir 101 when the differential pressure ΔPLS across any of the flow control valves 6*a,* 6*b,* 6*c* becomes higher than the load-sensing setting differential pressure ΔPLSref (=ΔPp) by a setting pressure Psp of the spring 80*d.* As a result, the pressure in the delivery line 100 is controlled to the setting differential pressure ΔPun that is higher than the load-sensing setting differential pressure ΔPLSref by the setting pressure Psp of the spring 80*d.* The setting differential pressure ΔPun of the unloading valve 80 at this time is given by ΔPun=ΔPLSref+Psp. Since the setting differential pressure ΔPun of the unloading valve 80 is determined based on the load-sensing setting differential pressure ΔPLSref, the setting differential pressure ΔPun of the unloading valve 80 also varies as the load-sensing setting differential pressure ΔPLSref varies depending on change in rotational speed of the engine 1. Thus, with respect to change in rotational speed of the engine 1, the setting differential pressure ΔPun is always given as a value higher than the load-sensing setting differential pressure ΔPLSref by the setting pressure Psp of the spring 80*d.*

The operation of the unloading valve 80 will be described below in comparison with the operation of a conventional unloading valve for holding the setting differential pressure ΔPun constant. Note that, in the following description, the conventional unloading valve is called a fixed unloading valve and the unloading valve in the present invention is called a variable unloading valve.

First, the operation of the setting modifying means 38 including the throttle 50 will be described.

The fixed displacement hydraulic pump 30 delivers the hydraulic fluid at a flow rate Qp expressed by the product of a rotational speed N of the engine 1 and a pump displacement Cm.

$$Qp=CmN \tag{1}$$

Given the opening area of the throttle 50 being Ap, the rotational speed N of the engine 1 and the differential pressure ΔPp across the variable throttle 31*a* are related to each other by the following formula:

$$Qp = cAp\sqrt{(2/\rho)\Delta Pp} \tag{2}$$

$$\Delta Pp=(\rho/2)(Qp/cAp)^2=(\rho/2)(CmN/cAp)^2 \tag{3}$$

Figure 2A:
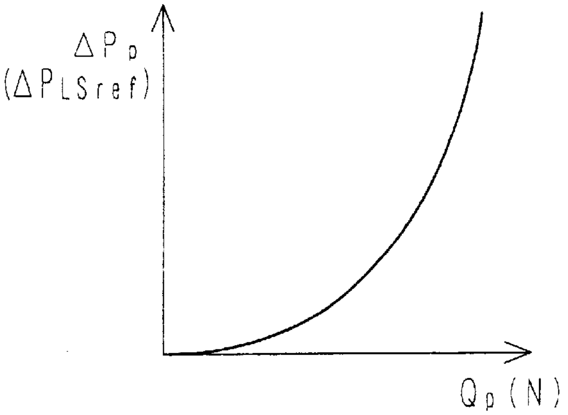
FIGS. 2A to 2C are graphs for explaining the operation of a flow rate detecting valve (throttle) shown in FIG. 1.

Since the throttle 50 is a fixed throttle and the opening area Ap is constant, the differential pressure ΔPp across the throttle 50 increases following a curve of secondary degree with respect to the delivery rate Qp of the hydraulic pump 30 or the rotational speed N of the engine 1 based on the formula (3), as shown in FIG. 2A. Also, since the relationship of ΔPLSref ΔPp holds by virtue of the second operation driver 32, the load-sensing setting differential pressure ΔPLSref also increases following a curve of secondary degree with respect to the delivery rate Qp of the hydraulic pump 30 or the rotational speed N of the engine 1, as shown in FIG. 2A.

Further, supposing the case where the differential pressure ΔPLS across one of the flow control valves 6*a,* 6*b,* 6*c,* e.g., the flow control valve 6*a,* is controlled to the target value ΔPLSref, a flow rate Qv demanded by the flow control valve 6*a* is expressed by the following formula on an assumption that an opening area of the flow control valve 6*a*is Av:

$$Qv = cAv\sqrt{((2/\rho)\Delta PLSref)} \tag{4}$$

Figure 2B:
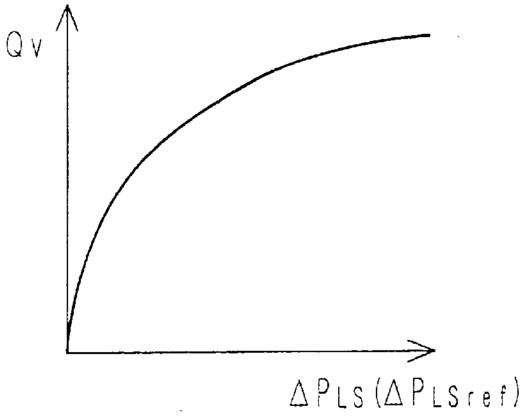

Thus the demanded flow rate Qv increases following a curve of secondary degree with respect to the target differential pressure ΔPLSref, as shown in FIG. 2B.

Here, the target differential pressure ΔPLSref across the flow control valve 6*a* is given by the differential pressure ΔPp across the throttle 50 (ΔPLSref ΔPp). Based on the formula (3), therefore, the demanded flow rate Qv can be related to the rotational speed N of the engine 1 by the following formula:

$$Qv \propto (Av/Ap)CmN \tag{5}$$

Figure 2C:
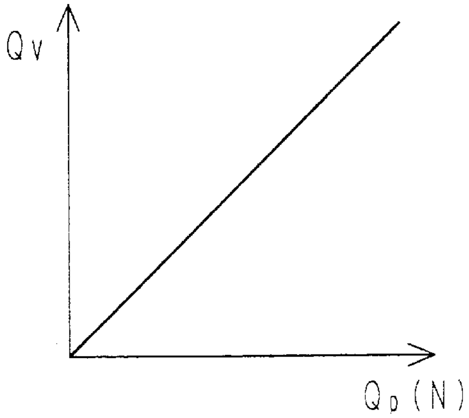

Stated otherwise, as a combined result of the relationship between the flow rate Qp and the differential pressure ΔPp across the throttle 50 expressed by a curve of secondary degree (formula (3)) shown in FIG. 2A and the relationship between the differential pressure ΔPLS across the flow control valve 6*a* and the demanded flow rate Qv thereof expressed by a curve of secondary degree (formula (4)) shown in FIG. 2B, the demanded flow rate Qv increases almost linearly with respect to the rotational speed N of the engine 1, as shown in FIG. 2C.

The above explanation is made for one flow control valve 6*a*. When driving a plurality of, e.g., two or three, actuators, the relationship of FIG. 2C is obtained for each of the flow control valves 6*a,* 6*b* or 6*a,* 6*b,* 6*c,* and the relationship between the rotational speed N of the engine 1 and a total of respective demanded rates Qv is given as one resulted from simply adding the relationship of FIG. 2C two or three times.

By varying the load-sensing setting differential pressure ΔPLSref and the demanded flow rate Qv depending on the engine rotational speed as explained above, it is possible to achieve an actuator speed depending on the engine rotational speed because the flow rate supplied to the actuator is varied depending on the engine rotational speed even with the opening area of the flow control valve kept constant. Also, when driving two or more actuators simultaneously, the pump delivery rate is distributed in accordance with an opening area ratio between the flow control valves and deterioration of operability in the combined operation is prevented.

Figure 3:
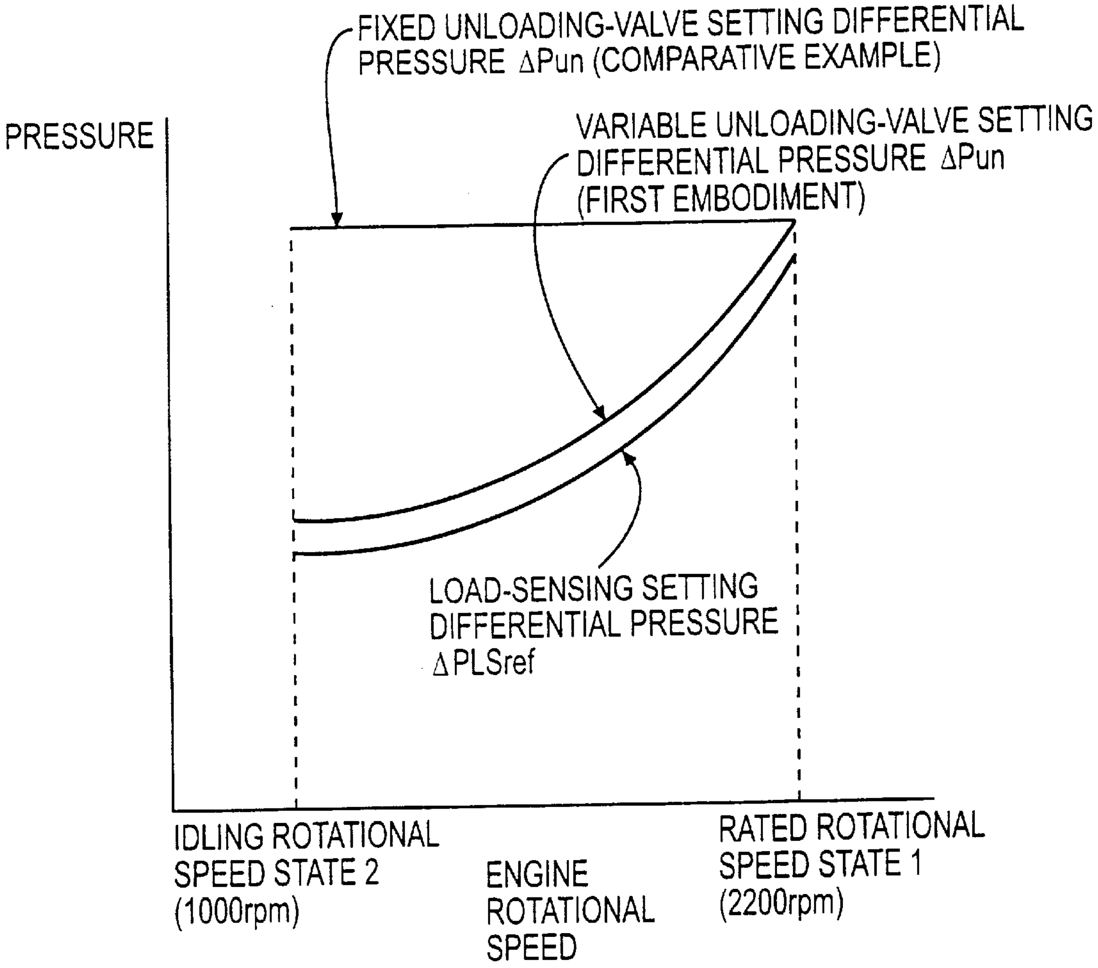
FIG. 3 is a graph showing the operation of an unloading valve in the first embodiment in comparison with the operation of a conventional unloading valve.

FIG. 3 shows the relationship between the load-sensing setting differential pressure ΔPLSref and the setting differential pressure ΔPun of the variable unloading valve 80 in the present invention resulted when the load-sensing setting differential pressure ΔPLSref varies depending on the engine rotational speed as explained above, in comparison with that resulted in the case of using the fixed unloading valve.

In FIG. 3, the load-sensing setting differential pressure ΔPLSref varies following a curve of secondary degree depending on the engine rotational speed in a like way as shown in FIG. 2A. Since the setting differential pressure ΔPun of the variable unloading valve in the present invention varies while keeping a value higher than the load-sensing setting differential pressure ΔPLSref by the setting pressure Psp of the spring 80*d,* the setting differential pressure ΔPun also varies following a curve of secondary degree depending on the engine rotational speed similarly to the load-sensing setting differential pressure ΔPLSref. On the other hand, the setting differential pressure ΔPun of the fixed unloading valve is constant regardless of change in the engine rotational speed.

In a state 1 where the rotational speed of the engine 1 is at the rated rotational speed suitable for ordinary excavation, both the conventional fixed unloading valve and the variable unloading valve in the present invention hold the setting differential pressures ΔPun each set to a value slightly higher than the load-sensing setting differential pressure ΔPLSref. Although the two setting differential pressures have the same value, the setting differential pressure of the fixed unloading valve is uniquely fixed, whereas the setting differential pressure held by the variable unloading valve in the present invention is given as a variable value higher than the load-sensing setting differential pressures ΔPLSref by the setting pressure Psp of the spring 80*d.* Consequently, in a state 2 where the engine rotational speed is at the idling rotational speed (lowest rotational speed), for example, lower than that in the state 1, the setting differential pressure ΔPun of the conventional fixed unloading valve has a value much higher than the load-sensing setting differential pressure ΔPLSref. By contrast, a difference between the setting differential pressure ΔPun of the variable unloading valve in the present invention and the load-sensing setting differential pressure ΔPLSref is not changed because the setting differential pressure ΔPun of the variable unloading valve in the present invention varies while keeping a value higher than the load-sensing setting differential pressure ΔPLSref by the setting pressure Psp of the spring 80*d.*

With this embodiment, as described above, the difference between the load-sensing setting differential pressure ΔPLSref and the setting differential pressure ΔPun of the unloading valve is not increased when the rotational speed of the engine 1 is lowered, and hence stability of the system can be ensured even at low rotational speeds of the engine 1.

A second embodiment of the present invention will be described with reference to FIGS. 4 to 11. In these drawings, equivalent members to those in FIG. 1 are denoted by the same reference numerals.

Figure 4:
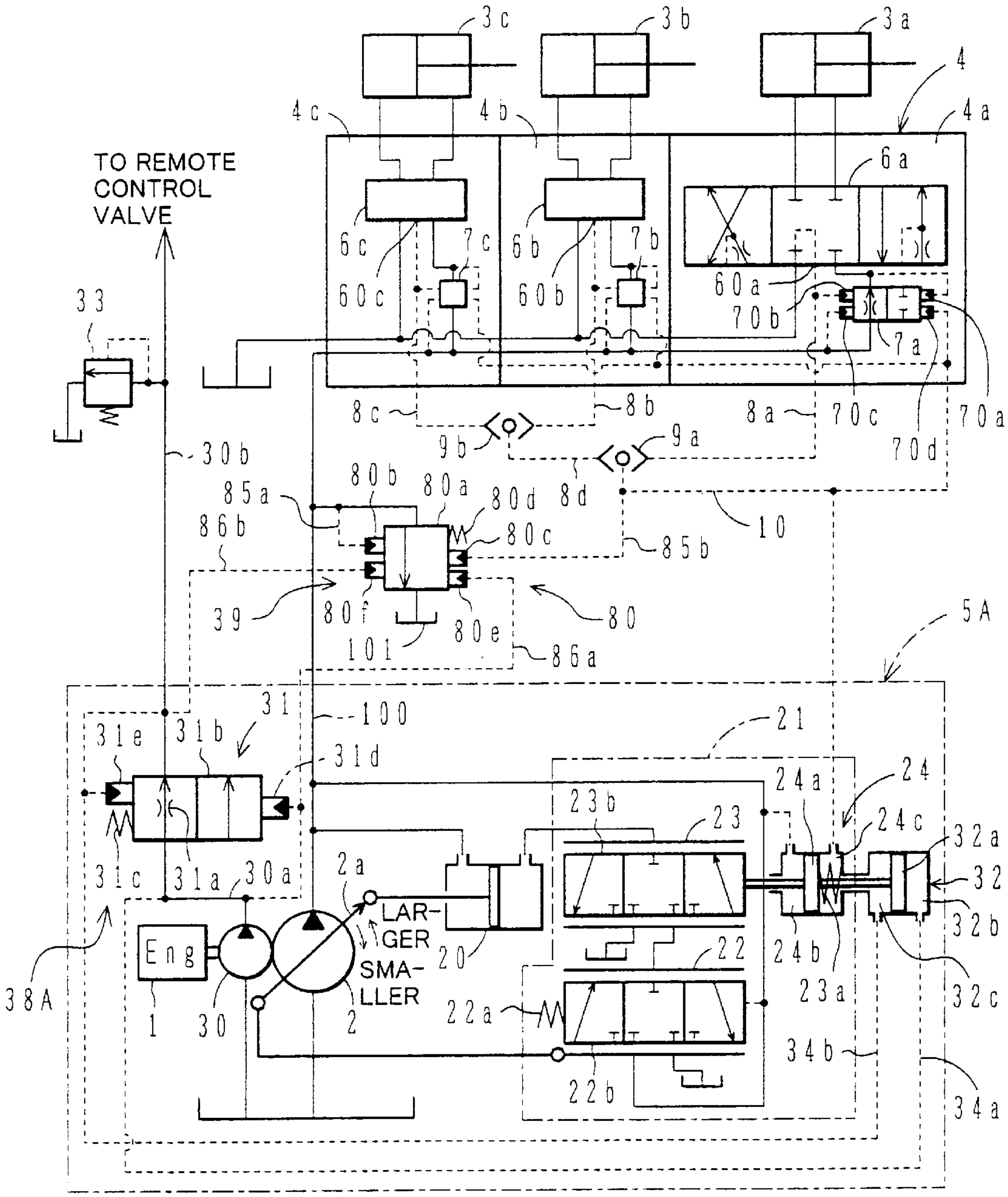
FIG. 4 is a hydraulic circuit diagram showing the configuration of a hydraulic drive system according to a second embodiment of the present invention.

Referring to FIG. 4, first setting modifying means 38A in a pump displacement control system 5A of this embodiment is constituted by a flow rate detecting valve 31 having an adjustable fixed throttle 31*a* disposed in the delivery line of the fixed displacement hydraulic pump 30 instead of the fixed throttle 50 shown in FIG. 1. The flow rate detecting valve 31 is constructed so as to adjust an operating condition of the fixed throttle 31*a* in accordance with a differential pressure across the flow rate detecting valve 31 itself. More specifically, the flow rate detecting valve 31 has a valve body 31*b* provided with the fixed throttle 31*a*. When a differential pressure ΔPp across the flow rate detecting valve 31 introduced to control pressure chambers 31*d*, 31*e* is not larger than a differential pressure corresponding to the resilient force of a spring 31*c* (referred to as a setting differential pressure hereinafter), the flow rate detecting valve 31 is held in a left-hand position on the drawing where the fixed throttle 31*a* develops its function. When the differential pressure ΔPp across the flow rate detecting valve 31 becomes higher than the setting differential pressure, the flow rate detecting valve 31 is shifted to a right-hand open position on the drawing from the left-hand position on the drawing where the fixed throttle 31*a* develops its function. With the provision of the flow rate detecting valve 31, the relationship between the rotational speed of the engine 1 and the load-sensing target differential pressure ΔPLSref can be provided in other more complex patterns than the simple proportional relationship provided by the fixed throttle 40. In this embodiment, the second setting modifying means 39 constituted by the control pressure chambers 80*e*, 80*f* of the unloading valve 80 also functions to vary the setting differential pressure ΔPun of the unloading valve 80 depending on change in the load-sensing setting differential pressure ΔPLSref, whereby similar advantages as in the first embodiment can be obtained.

Details of the flow rate detecting valve 31 will be described with reference to FIG. 5.

Figure 5:
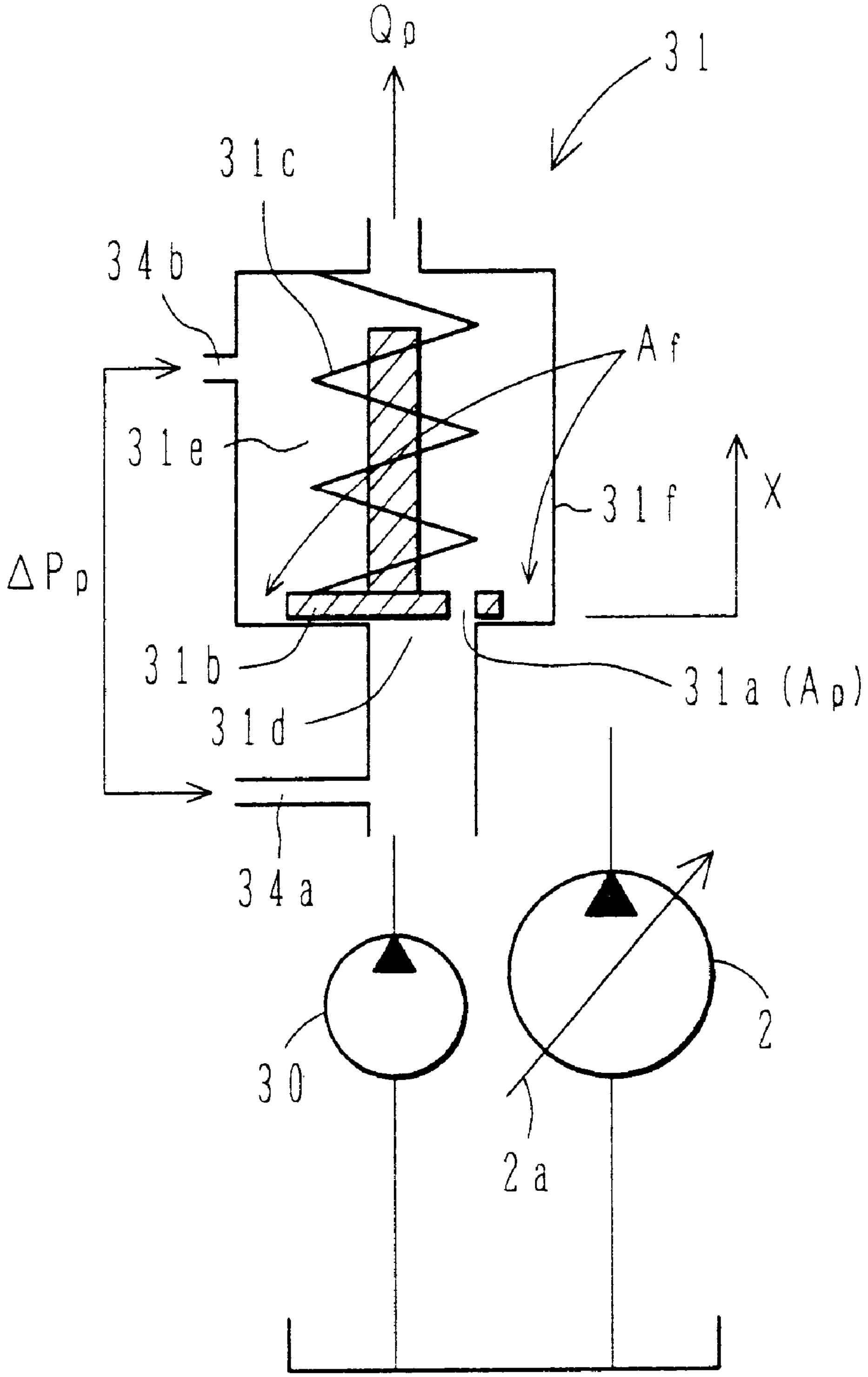
FIG. 5 is a diagram showing details of a flow rate detecting valve shown in FIG. 4.

In FIG. 5, a piston serving as the valve body 31*b* moves within a casing 31*f* and the piston 31*b* has a small hole formed therein to serve as the fixed throttle 31*a*. The small hole has an opening area Ap of the fixed throttle 31*a*. Further, the casing 31*f* has a cylindrical shape and a gap having an opening area Af is defined between an outer circumferential surface of the piston 31*b* and an inner circumferential surface of the casing 31*f*. The opening area Af is selected to a large value enough to prevent the gap from serving as a throttle in fact.

The piston 31*b* is supported by the spring 31*c*, and a resilient force F of the spring 31*c* acts on the piston 31*b* in the direction to close an inlet of the casing 31*f* and to make the function of the fixed throttle 31*a* effective.

When the inlet of the casing 31*f* is closed by the piston 31*b*, the differential pressure ΔPp across the fixed throttle 31*a* produces a hydraulic force Fh acting on the piston 31*b* in the direction to open the casing inlet (upward on the drawing) due to a flow of the hydraulic fluid in the casing 31*f* while passing the fixed throttle 31*a*. When the hydraulic force Fh is smaller than the force F of the spring 31*c*, the piston 31*b* is held in a state of keeping the inlet of the casing 31*f* closed, allowing the hydraulic fluid to flow just through the fixed throttle 31*a*. In other words, the fixed throttle 31*a* functions effectively.

When a flow rate of the hydraulic fluid delivered from the fixed displacement pump 30 increases and the hydraulic force Fh exceeds the force F of the spring 31*c*, the piston 31*b* is moved upward to open the casing inlet. In this state, the hydraulic fluid is allowed to flow through the gap having the opening area Af and therefore the fixed throttle 31*a* does no longer function. Since the hydraulic force Fh is eliminated upon the fixed throttle 31*a* stopping the function, the piston 31*b* is moved downward to close the casing inlet. However, as soon as the casing inlet is closed, the hydraulic force is generated to open the casing inlet again. As a result of repeating the above up and down movement, the piston 31*b* comes to a standstill in a position x where the two forces F and Fh are balanced. In the standstill position, throttle control is performed so that the differential pressure ΔPp across the flow rate detecting valve 31 is maintained at the differential pressure corresponding to the resilient force of a spring 31*c*, i.e., the setting differential pressure.

Here, the differential pressure ΔPp across the flow rate detecting valve 31 introduced to the control pressure chambers 31*d*, 31*e* varies depending on the rotational speed of the engine 1. Specifically, as the rotational speed of the engine 1 lowers, the delivery rate of the hydraulic pump 30 is reduced and the differential pressure ΔPp across the flow rate detecting valve 31 is also reduced. Accordingly, when the engine rotational speed is lower than an engine rotational speed corresponding to the setting differential pressure specified by the spring 31*c* (referred to as a setting rotational speed hereinafter), the flow rate detecting valve 31 is held in a position where the fixed throttle 31*a* develops its function (i.e., the left-hand position in FIG. 4), and when the engine rotational speed exceeds the setting rotational speed, the flow rate detecting valve 31 controls a throttle condition so as to maintain the differential pressure ΔPp across the flow rate detecting valve 31 at the setting differential pressure specified by the spring 31*c*.

Stated otherwise, the control pressure chambers 31*d*, 31*e* and the spring 31*c* function as throttle adjusting means for making the fixed throttle 31*a* effective when the engine rotational speed is in a region including the lowest rotational speed, and controlling the fixed throttle 31*a* to reduce an increase rate of the differential pressure ΔPp across the flow rate detecting valve 31 when the engine rotational speed rises to the setting rotational speed lower than the rated rotational speed. Also, as a result of the above arrangement, the flow rate detecting valve 31 is constructed to have a larger opening area when the engine rotational speed is in the region including the rated rotational speed than when it is in the region including the lowest rotational speed.

The operation and resulting effect of the first setting modifying means 38A including the flow rate detecting valve 31, constructed as explained above, will now be described below.

Figure 6A:
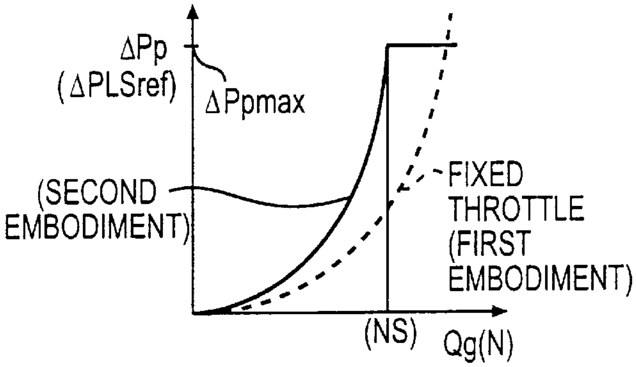
FIGS. 6A to 6C are graphs showing the operation of a flow rate detecting valve shown in FIG. 4 in comparison with the operation of the flow rate detecting valve shown in FIG. 1.

Assuming that the setting rotational speed corresponding to the resilient force of the spring 31*c* of the flow rate detecting valve 31 is Ns, when the engine rotational speed N is lower than the setting rotational speed Ns, the flow rate detecting valve 31 is held in the left-hand position in FIG. 4 where the fixed throttle 31*a* develops its function, as explained above, and the opening area Ap is constant. Based on the aforesaid formula (3), therefore, the differential pressure ΔPp across the flow rate detecting valve 31 increases following a curve of secondary degree with respect to the delivery rate Qp of the hydraulic pump 30 or the rotational speed N of the engine 1, as shown in FIG. 6A. It to be noted that the opening area Ap of the fixed throttle 31*a* is set smaller than that of the fixed throttle 50 in the first embodiment and consequently an increase rate of the differential pressure ΔPp across the fixed throttle 31*a* is higher than the case of using the fixed throttle 50 indicated by a dotted line.

When the engine rotational speed N exceeds the setting rotational speed Ns, the flow rate detecting valve 31 operates so as to maintain the differential pressure ΔPp across itself at the setting differential pressure specified by the spring 31*c*. The differential pressure ΔPp across the flow rate detecting valve 31 is therefore kept substantially constant at ΔPpmax, as shown in FIG. 6A.

Figure 6B:
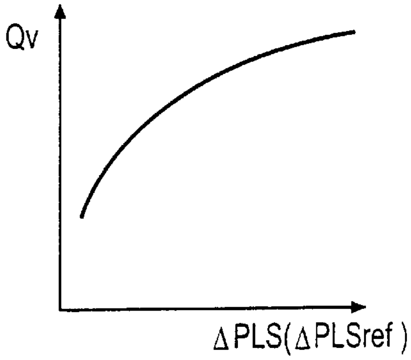

In a like manner as explained above in connection with FIG. 2C, a flow rate Qv demanded by each of the flow control valves 6*a,* 6*b,* 6*c* increases following a curve of secondary degree with respect to the target differential pressure ΔPLSref, as shown in FIG. 6B.

Figure 6C:
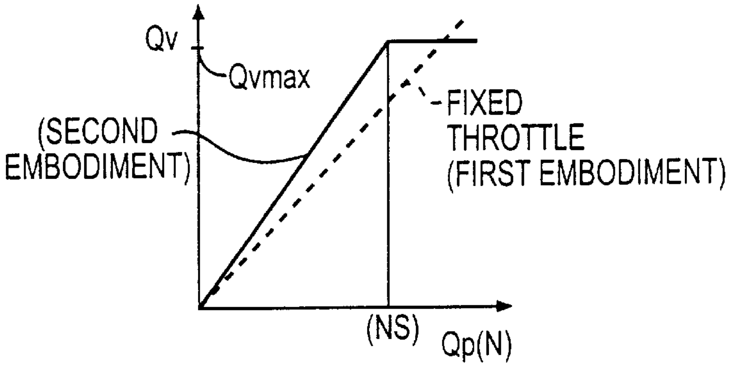

As a combined result of the characteristic of FIG. 6A and the characteristic of FIG. 6B, the demanded flow rate Qv varies with respect to the rotational speed N of the engine 1, as shown in FIG. 6C. More specifically, when the engine rotational speed N is lower than the setting rotational speed Ns, the change of ΔPp represented by a curve of secondary degree shown in FIG. 6A and the change of the demanded flow rate Qv represented by a curve of secondary degree shown in FIG. 6B cancel each other. As a result, the demanded flow rate Qv increases almost linearly with respect to the rotational speed N of the engine 1. A gradient of the linear line (change rate) is however greater than in the case of using the fixed throttle 50 indicated by a dotted line. When the engine rotational speed N exceeds the setting rotational speed Ns, ΔPp in FIG. 6A is kept substantially constant at ΔPpmax and therefore the demanded flow rate Qv is also kept substantially constant correspondingly.

As stated above, when driving a plurality of, e.g., two or three, actuators, the relationship of FIG. 6C is obtained for each of the flow control valves 6*a,* 6*b* or 6*a,* 6*b,* 6*c,* and the relationship between the rotational speed N of the engine 1 and a total of respective demanded rates Qv is given as one resulted from simply adding the relationship of FIG. 6C two or three times.

Figure 7:
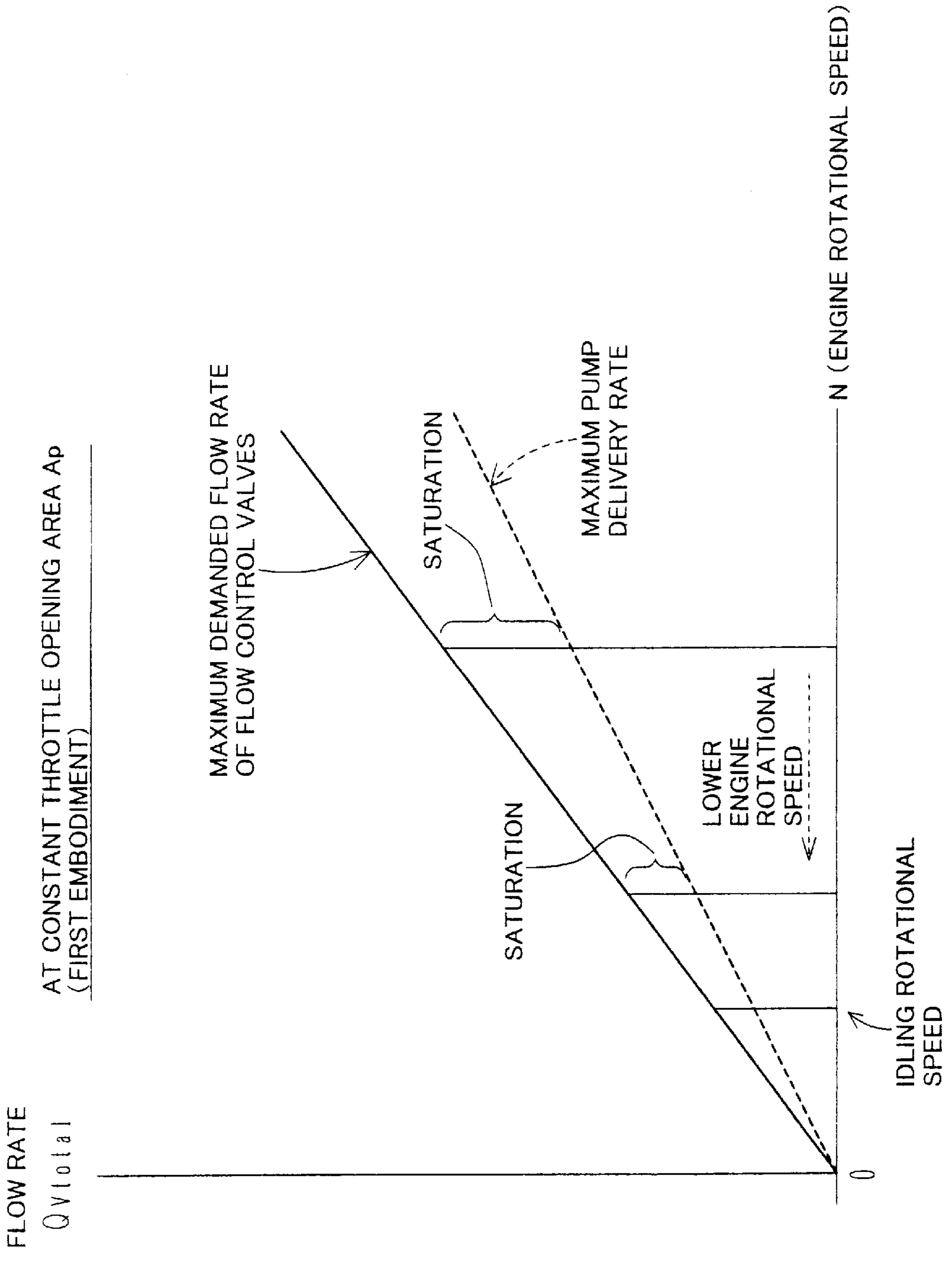
FIG. 7 is a graph showing the relationships of an engine rotational speed versus a maximum demanded flow rate of flow control valves and a maximum pump delivery rate in a conventional system.

In the first embodiment using the fixed throttle 50 as a flow rate detecting valve, the relationships of the rotational speed N of the engine 1 versus a total maximum demanded flow rate Qvtotal of any two of the flow control valves 6*a,* 6*b,* 6*c,* e.g., the flow control valves 6*a,* 6*b,* (i.e., total of the flow rates Qv demanded by the flow control valves 6*a,* 6*b* at maximum opening areas thereof) and a maximum delivery rate Qsmax of the variable displacement hydraulic pump 2 are represented as shown FIG. 7. When driving the actuators 3*a,* 3*b* simultaneously, a ratio of the total maximum demanded flow rate Qvtotal of the flow control valves 6*a,* 6*b* to the maximum delivery rate Qsmax of the hydraulic pump 2 does not change despite change in the rotational speed N of the engine 1 and a shortage of the flow rate accompanying with a saturation phenomenon during the combined operation does not change in its proportion depending on the rotational speed N of the engine 1.

Figure 8:
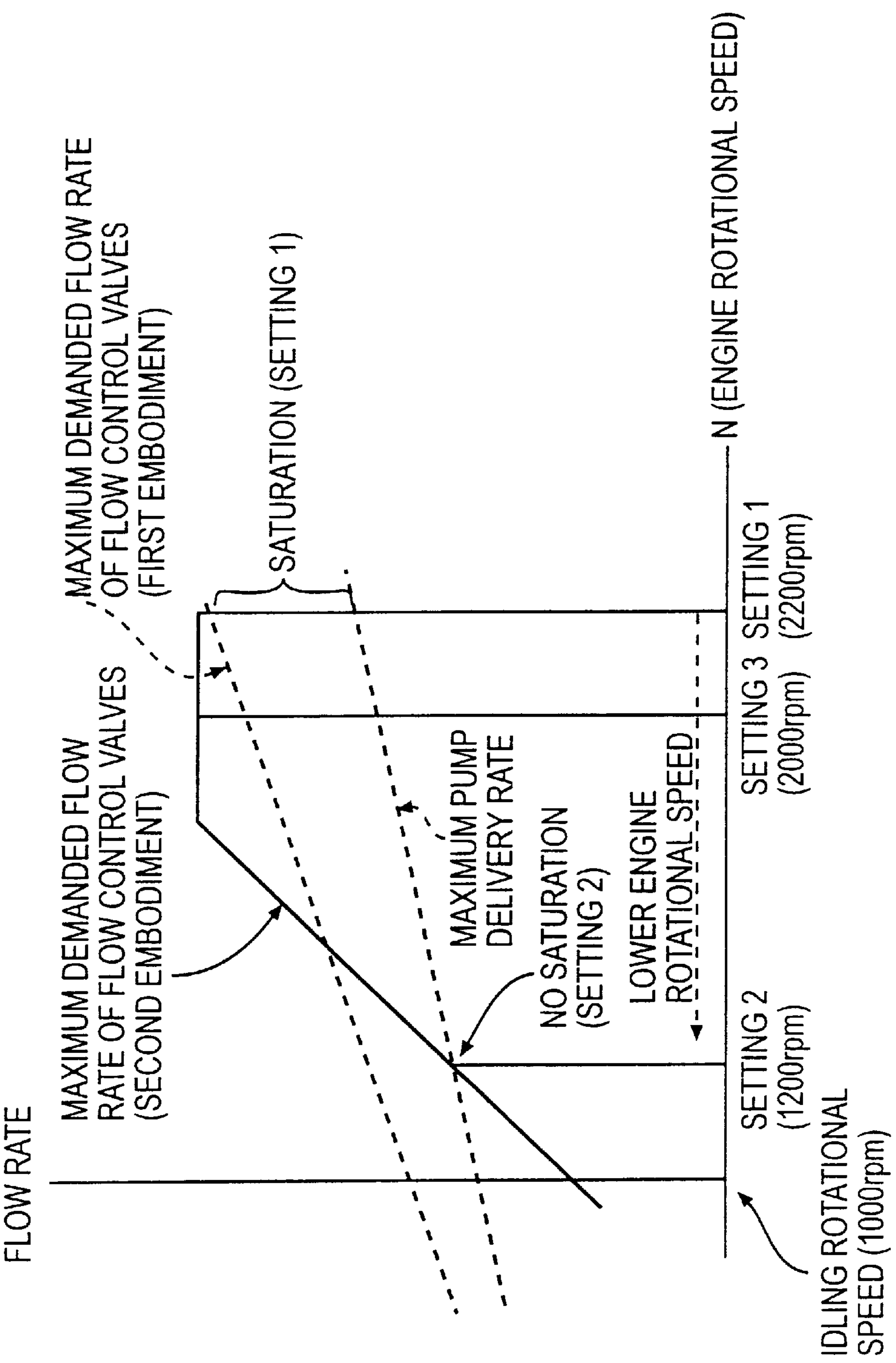
FIG. 8 is a graph showing the relationships of an engine rotational speed versus a maximum demanded flow rate of flow control valves and a maximum pump delivery rate as resulted from the provision of the flow rate detecting valve shown in FIG. 4.

By contrast, in this embodiment, the relationships of the rotational speed N of the engine 1 versus a total maximum demanded flow rate Qvtotal of any two of the flow control valves 6*a,* 6*b,* 6*c,* e.g., the flow control valves 6*a,* 6*b,* (i.e., total of the flow rates Qv demanded by the flow control valves 6*a,* 6*b* at maximum opening areas thereof) and a maximum delivery rate Qsmax of the variable displacement hydraulic pump 2 are represented as shown FIG. 8 based on the characteristic of FIG. 6C.

In FIG. 8, at setting 1 where the rotational speed N of the engine 1 is set to be suitable for carrying out ordinary work, the system is under a condition giving rise to saturation because the total maximum demanded flow rate Qvtotal of the flow control valves 6*a,* 6*b* when driving the plural actuators 3*a,* 3*b* is greater than the maximum delivery rate of the hydraulic pump 2. On the other hand, at setting 2 where the rotational speed N of the engine 1 is set to a low value, the total maximum demanded flow rate Qvtotal of the flow control valves 6*a,* 6*b* is reduced to become smaller than the maximum delivery rate of the hydraulic pump 2 and hence no saturation occurs.

Here, the setting 2 represents an engine rotational speed suitable for fine operation. Specifically, since it is generally said that a rotational speed lower than the middle between the rated rotational speed and the lowest rotational speed is suitable for fine operation, the setting 2 corresponds to a rotational speed lower than the middle rotational speed.

Assuming, for example, that the rated rotational speed of the engine 1 is 2,200 rpm and the lowest rotational speed (idling rotational speed) is 1,000 rpm, the middle rotational speed is 1,600 rpm and the setting 2 represents a rotational speed lower than 1,600 rpm. In the illustrated example, the setting 2 represents 1,200 rpm. Additionally, in the illustrated example, "the setting 1" represents the rated rotational speed of 2,200 rpm.

As explained above, the flow rate detecting valve 31 is constructed to have a larger opening area when the engine rotational speed is in the region including the rated rotational speed than when it is in the region including the lowest rotational speed. The first setting modifying means 38A made up of the flow rate detecting valve 31, the fixed displacement hydraulic pump 30 and the second operation driver 32 detects a rotational speed of the engine 1, and when the detected engine rotational speed is in the region including the lowest rotational speed, the means 38A modifies the setting value ΔPLSref of the pump displacement control system 5 so that the total maximum demanded flow rate Qvtotal of the plural flow control valves 6*a,* 6*b,* which is expressed based on the products of the differential pressure ΔPLS and the respective opening areas of the plural flow control valves 6*a,* 6*b,* is smaller than the maximum delivery rate Qsmax of the hydraulic pump 2 determined by the engine rotational speed at that time.

Figure 9:
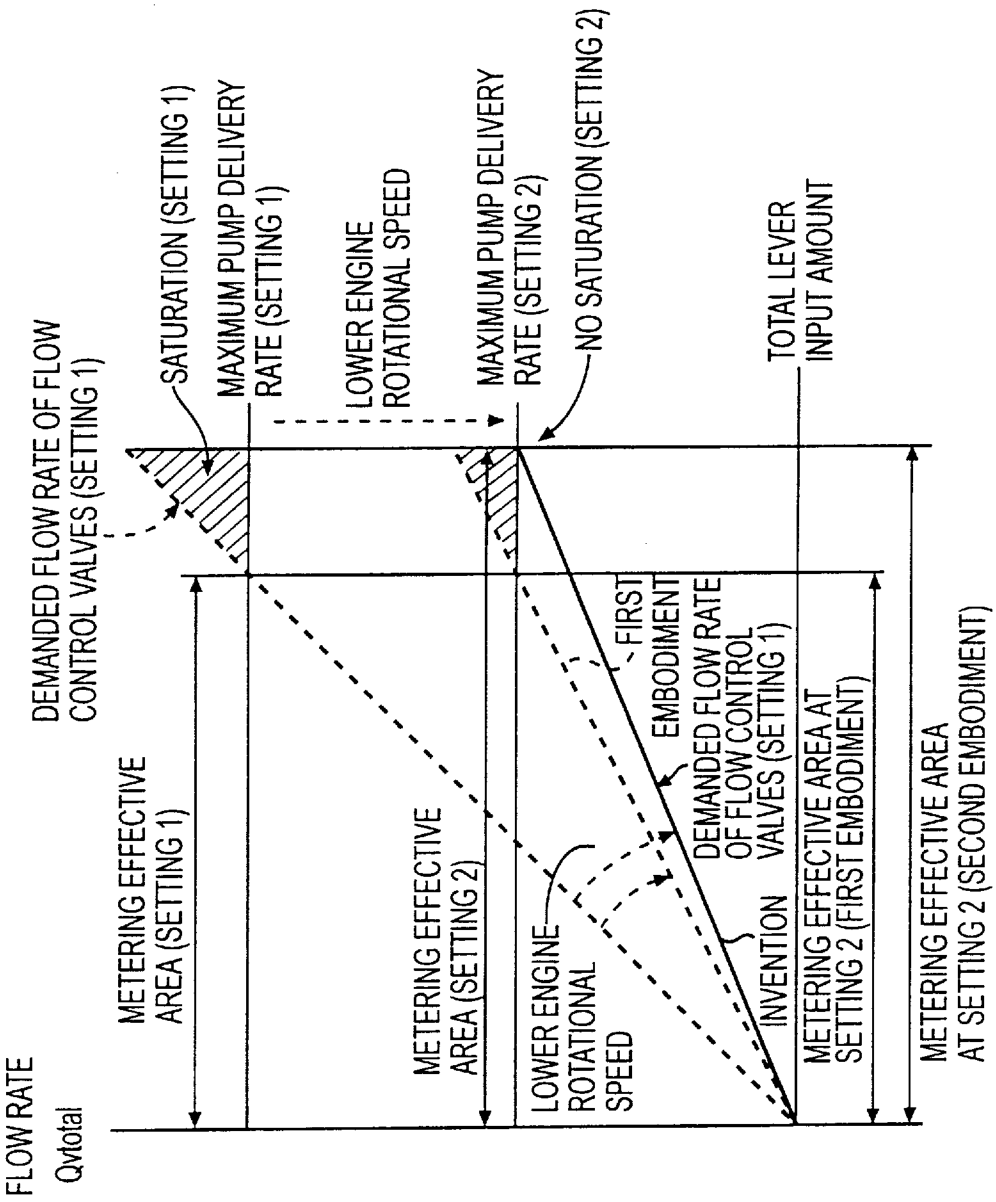
FIG. 9 is a graph showing the relationship between a total lever input amount and a flow rate passing through the flow control valves as resulted from the provision of the flow rate detecting valve shown in FIG. 4.

FIG. 9 shows characteristics of the setting modifying means 38A in terms of the relationship between a total lever input amount applied from an operator to the flow control valves 6*a,* 6*b* and the total demanded flow rate of the flow control valves 6*a,* 6*b* (total flow rate passing therethrough).

In FIG. 9, as the engine rotational speed lowers, the maximum flow rate Qsmax capable of being supplied from the hydraulic pump 2 to the flow control valves is reduced. Concurrently, the total demanded flow rate Qvtotal of the flow control valves 6*a,* 6*b* corresponding to the total lever input amount is reduced to become lower than the maximum delivery rate Qsmax of the hydraulic pump 2. Thus a gradient of the line representing change in the flow rate passing through the flow control valves 6*a,* 6*b* is so reduced as to ensure a wide metering effective area.

In the first embodiment using the fixed throttle 50, since the ratio of the total maximum demanded flow rate Qvtotal of the flow control valves 6*a,* 6*b* to the maximum delivery rate Qsmax of the hydraulic pump 2 does not change despite a lowering of the rotational speed N of the engine 1 and a shortage of the flow rate accompanying with a saturation phenomenon occurs at the same proportion as shown in FIG. 7, a gradient of the line representing change in the flow rate passing through the flow control valves 6*a,* 6*b* is so large as to narrow the metering effective area, as indicated by a one-dot-chain line in FIG. 9.

Consequently, in this embodiment, when the operator sets the engine rotational speed to a low value with the intent to carry out slow-speed operation, there occurs no saturation even with combined lever operations which give rise to saturation at the ordinary setting of the engine rotational speed; hence good operability can be realized using the wide metering effective area.

Figure 10:
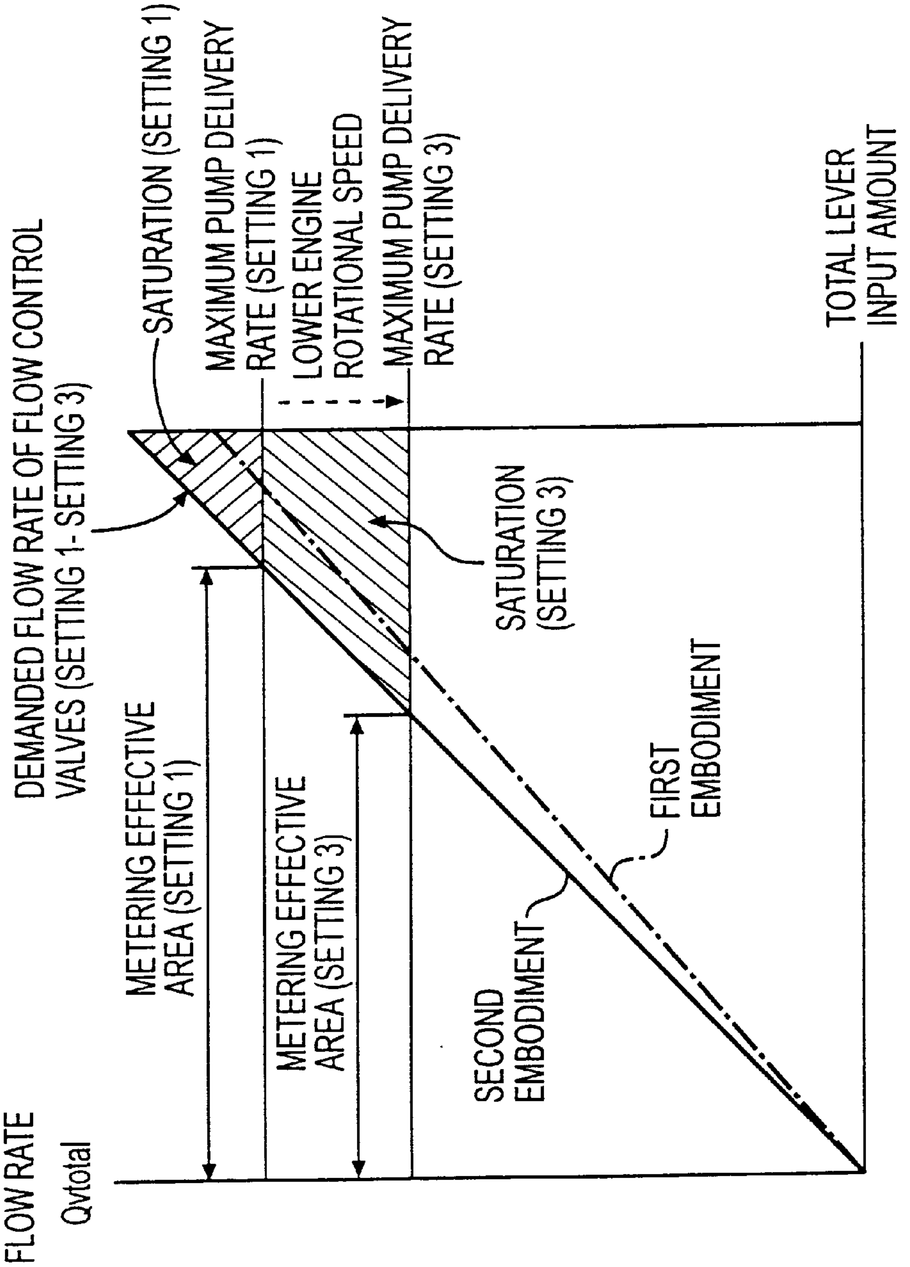
FIG. 10 is a graph showing the relationship between a total lever input amount and a flow rate passing through the flow control valves as resulted from the provision of the flow rate detecting valve shown in FIG. 4.

Furthermore, in FIG. 10, at setting 3 where the rotational speed N of the engine 1 is set to a value (e.g., around 2,000 rpm) slightly lower than at the ordinary setting (setting 1), the total maximum demanded flow rate Qvtotal of the flow control valves 6*a,* 6*b* is reduced a little from that at the ordinary setting (setting 1), but the amount of change is so small that the total maximum demanded flow rate Qvtotal of the flow control valves 6*a,* 6*b* is held at a higher value than that resulted when providing the setting 3 in the comparative example. In such a condition, a saturation phenomenon tends to easily occur at engine rotational speeds around the setting value (setting 1) suitable for ordinary work. As indicated by a solid line in FIG. 10, however, a gradient of the line representing change in the flow rate passing through the flow control valves 6*a,* 6*b* with respect to the total lever input amount is not virtually changed from the gradient resulted at the setting 1. Accordingly, even when the rotational speed of the engine 1 is varied to some extent from the setting suitable for ordinary work, the operating speed of the actuator is kept at the same level and the operation can be performed with good response. In the first embodiment using the fixed throttle 50, as indicated by a one-dot-chain line in FIG. 10, a gradient of the line representing change in the flow rate passing through the flow control valves 6*a,* 6*b* with respect to the total lever input amount is somewhat diminished, whereby the operating speed and response of the actuator are reduced correspondingly.

In ordinary work, greater importance is placed on response and powerful movement of the actuator rather than operability having a wider metering effective area from the practical point of view. Consequently, this embodiment can provide the operator with a good feeling in the operation.

Figure 11:
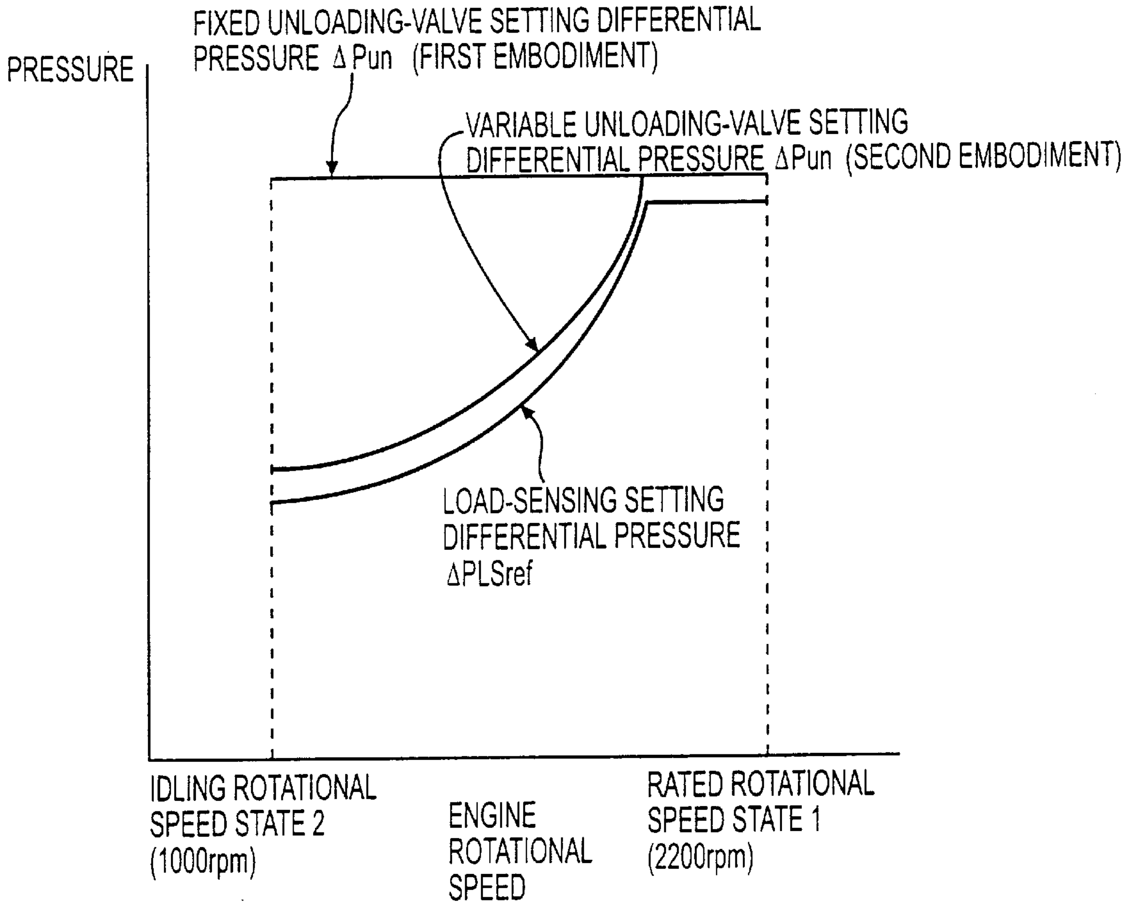
FIG. 11 is a graph showing the operation of an unloading valve in the second embodiment in comparison with the operation of the conventional unloading valve.

FIG. 11 shows the relationship between the load-sensing setting differential pressure ΔPLSref and the setting differential pressure ΔPun of the variable unloading valve 80 in the present invention resulted when the load-sensing setting differential pressure ΔPLSref varies depending on the engine rotational speed as explained above, in comparison with that resulted in the case of using the fixed unloading valve.

In FIG. 11, the load-sensing setting differential pressure ΔPLSref varies following a curve of secondary degree depending on the engine rotational speed until the setting rotational speed Ns in a like way as shown in FIG. 6A, and ΔPLSref is then held almost constant at the engine rotational speed not lower than Ns. Since the setting differential pressure ΔPun of the variable unloading valve 80 varies likewise in this embodiment while keeping a value higher than the load-sensing setting differential pressure ΔPLSref by the setting pressure Psp of the spring 80*d,* the setting differential pressure ΔPun also varies following a curve of secondary degree depending on the engine rotational speed until the setting rotational speed Ns and is then held constant at the engine rotational speed not lower than Ns similarly to the load-sensing setting differential pressure ΔPLSref. The setting differential pressure ΔPun of the fixed unloading valve is constant all over the range of the engine rotational speed.

With this embodiment, as described above, even in the case of the load-sensing setting differential pressure ΔPLSref varying in a complex pattern, the setting differential pressure ΔPun of the unloading valve can be adjusted correspondingly. Similarly to the first embodiment, therefore, the difference between the load-sensing setting differential pressure ΔPLSref and the setting differential pressure ΔPun of the unloading valve is not increased when the rotational speed of the engine 1 is lowered, and hence stability of the system can be ensured even at low rotational speeds of the engine 1.

Also, with this embodiment, a saturation phenomenon is improved in consideration of the engine rotational speed such that when the engine rotational speed is set to a low value, good operability in fine operation can be achieved, and when the engine rotational speed is set to a high value, a powerful feeling can be realized in the operation with good response. It is thus possible to establish the system setting adapted for the purpose of work intended by the operator based on setting of the engine rotational speed.

Further, this embodiment can provide a practical flow rate detecting valve because the casing 31*f* of the flow rate detecting valve 31*b* has a simple cylindrical shape and hence can be manufactured very easily.

Figure 12:
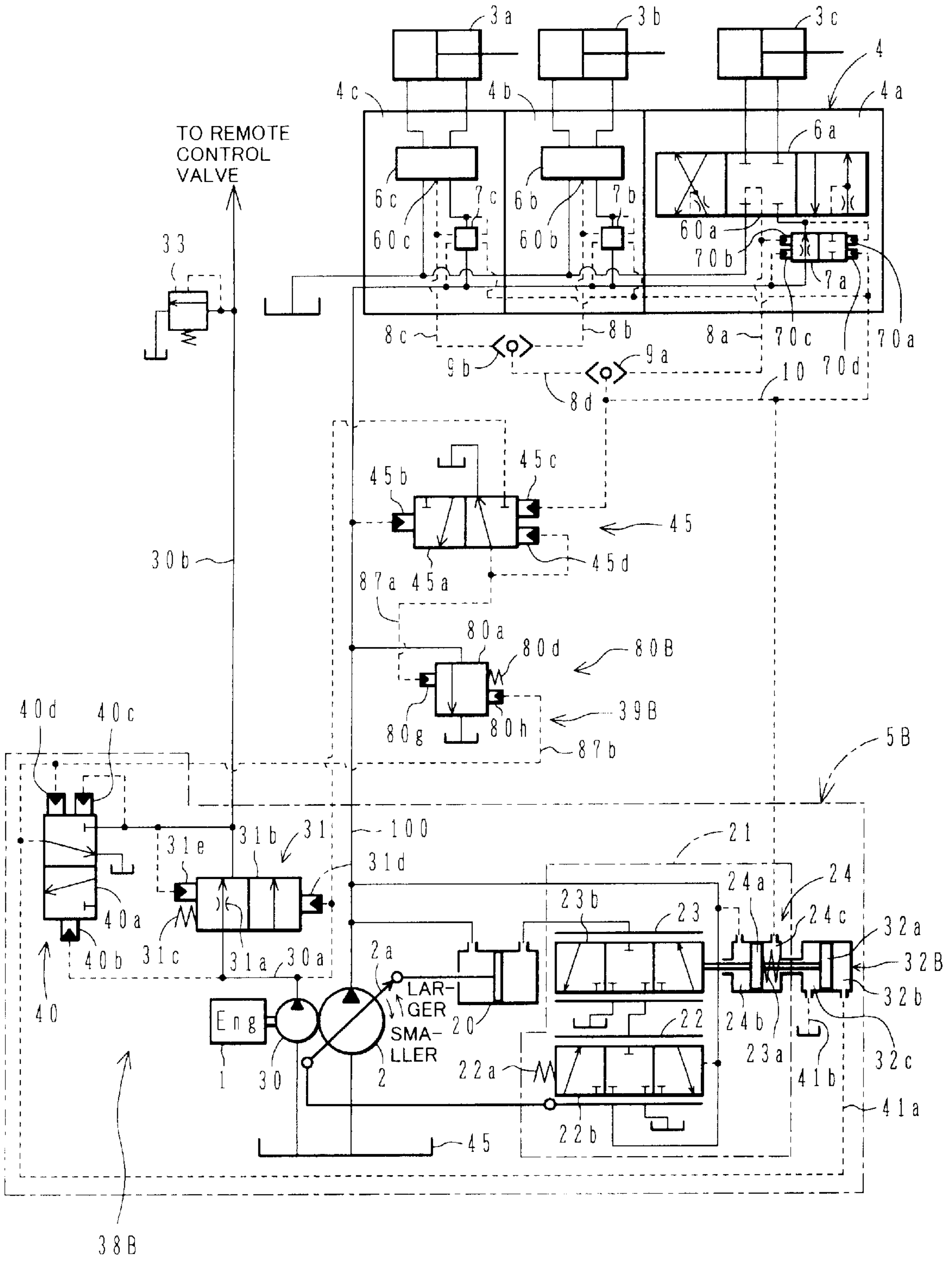
FIG. 12 is a hydraulic circuit diagram showing the configuration of a hydraulic drive system according to a third embodiment of the present invention.

A third embodiment of the present invention will be described below with reference to FIG. 12. In FIG. 12, equivalent members to those in FIGS. 1 and 4 are denoted by the same reference numerals.

Referring to FIG. 12, in a pump displacement control system 5B of this embodiment, first setting modifying means 38B includes a pressure control valve 40 for outputting a signal pressure which corresponds to the differential pressure ΔPp across the flow rate detecting valve 31. The pressure control valve 40 has a control pressure chamber 40*b* urging a valve body 40*a* in the direction to increase pressure, and control pressure chambers 40*c,* 40*d* urging the valve body 40*a* in the direction to reduce pressure. A pressure upstream of the flow rate detecting valve 31 is introduced to the control pressure chamber 40*b,* whereas a pressure downstream of the flow rate detecting valve 31 and an output pressure of the pressure control valve 40 itself are introduced to the control pressure chambers 40*c,* 40*d,* respectively. The signal pressure corresponding to the differential pressure ΔPp across the variable throttle 31*a* is produced as an absolute pressure based on balance among the above pressures. The signal pressure is introduced to a hydraulic pressure chamber 32*b* of a second operation driver 32B via a pilot line 41*a,* and a hydraulic pressure chamber 32*c* of the second operation driver 32B is communicated with a reservoir via a pilot line 41*b.*

Further, there is provided a pressure control valve 45 for generating a signal pressure which corresponds to the differential pressure ΔPLS between the delivery pressure Ps of the hydraulic pump 2 and the maximum load pressure PLS among the plurality of actuators 3*a,* 3*b,* 3*c.* The pressure control valve 45 has a control pressure chamber 45*b* urging a valve body 45*a* in the direction to increase pressure, and control pressure chambers 45*c,* 45*d* urging the valve body 45*a* in the direction to reduce pressure. The delivery pressure Ps of the hydraulic pump 2 is introduced to the control pressure chamber 45*b,* whereas the maximum load pressure PLS and an output pressure of the pressure control valve 45 itself are introduced to the control pressure chambers 45*c,* 45*d,* respectively. The signal pressure corresponding to the differential pressure ΔPLS between the pump delivery pressure Ps and the maximum load pressure PLS is produced as an absolute pressure based on balance among those pressures.

An unloading valve 80B has one control pressure chamber 80*g* applying pressure to act in the direction to increase an opening degree thereof instead of the first and second two control pressure chambers 80*b,* 80*c* shown in FIG. 1, and one control pressure chamber 80*h* applying pressure to act in the direction to reduce the opening degree thereof instead of the third and fourth two control pressure chambers 80*e,* 80*f* shown in FIG. 1. The signal pressure from the pressure control valve 45 is introduced to the control pressure chamber 80*g* via a pilot line 87*a,* and the signal pressure from the pressure control valve 40 is introduced to the control pressure chamber 80*h* via a pilot line 87*b*.

In this embodiment thus constructed, the second operation driver 32B operates likewise to modify the target differential pressure ΔPLSref depending on the differential pressure ΔPp across the flow rate detecting valve 31, and the unloading valve 80B operates to modify the setting differential pressure ΔPun in match with the target differential pressure ΔPLSref depending on the differential pressure ΔPp across the flow rate detecting valve 31.

Accordingly, this embodiment can also provide similar operating advantages as obtainable with the second embodiment.

Further, with this embodiment, the first setting modifying means 38B requires only one pilot line 41*a* for introducing the signal pressure from the flow rate detecting valve 31 to the second operation driver 32 and the unloading valve 80B requires only two pilot line 87*a,* 87*b* for introducing the signal pressure, resulting in a simpler circuit configuration. In addition, because each of the pressure control valves 40, 45 detects the differential pressure as an absolute pressure, the signal pressure is produced at a lower level than the case of detecting the individual pressure as they are, resulting in that the pilot lines 41*a,* 41*b,* 87*a,* 87*b* can be formed of hoses or the like adapted for relatively low pressures and the circuit configuration can be achieved with a lower cost.

It is to be noted that while the above embodiments have been explained as detecting the engine rotational speed and modifying the target differential pressure based on the detected speed in a hydraulic manner, such a process may be performed electrically by, e.g., detecting the engine rotational speed with a sensor and calculating the target differential pressure from a sensor signal.

Additionally, while the pressure compensating valves have been described as being of the pre-stage type installed upstream of the flow control valves, the pressure compensating valves may be of the post-stage type installed downstream of the flow control valves to control respective output pressures of all the flow control valves to the same maximum load pressure, thereby controlling respective differential pressures across the flow control valves to the same differential pressure ΔPLS.

Industrial Applicability

According to the present invention, it is possible to achieve stable load sensing control without being affected by the engine rotational speed.

What is claimed is:

1. A hydraulic drive system comprising an engine, a variable displacement hydraulic pump driven by said engine, a plurality of actuators driven by a hydraulic fluid delivered from said hydraulic pump, a plurality of flow control valves for controlling flow rates of the hydraulic fluid supplied from said hydraulic pump to a plurality of actuators, and pump displacement control means for controlling the displacement of said hydraulic pump so that a differential pressure ΔPLS between a delivery pressure Ps of said hydraulic pump and a maximum load pressure PLS among said plurality of actuators is maintained at a first setting value ΔPLSref, said pump displacement control means including first setting modifying means for modifying the first setting value ΔPLSref of said pump displacement control means depending on a rotational speed of said engine, wherein said hydraulic drive system further comprises:

an unloading valve for controlling the delivery pressure Ps of said hydraulic pump so that the differential pressure ΔPLS between the delivery pressure of said hydraulic pump and the maximum load pressure PLS among said plurality of actuators is maintained at a second setting value ΔPun higher than said first setting value ΔPLSref, and second setting modifying means for modifying the second setting value ΔPun of said unloading valve depending on the rotational speed of said engine (1) in match with change in the first setting value ΔPLSref modified by said first setting modifying means in such a manner that the second setting value Δpun does not become smaller than the first setting value ΔPLSref.

2. A hydraulic drive system according to claim 1, wherein said first setting modifying means comprises a fixed displacement hydraulic pump driven by said engine along with said variable displacement hydraulic pump, a flow rate detecting valve disposed in a delivery line of said fixed displacement hydraulic pump, and an operation driver for modifying said first setting value ΔPLSref depending on a differential pressure ΔPp across said flow rate detecting valve, and wherein said second setting modifying means includes control pressure chambers for modifying the second setting value Δpun said unloading valve depending on the differential pressure ΔPp across said flow rate detecting valve.

3. A hydraulic drive system according to claim 1, wherein said first setting modifying means detects the rotational speed of said engine and, when the detected engine rotational speed is in a region including the lowest rotational speed of said engine, modifies the first setting value ΔPLSref of said pump displacement control means so that a total maximum flow rate Qvtotal of said plurality of flow control valves passing respective flow rates expressed by the products of said differential pressure ΔPLS and respective opening areas of said plurality of flow control valves is smaller than a maximum delivery rate Qsmax of said hydraulic pump corresponding to the engine rotational speed at that time, and wherein said second setting modifying means modifies the second setting value Δpun said unloading valve in match with change in said first setting value ΔPLSref.

4. A hydraulic drive system according to claim 1, wherein said first setting modifying means comprises a fixed displacement hydraulic pump driven by said engine along with said variable displacement hydraulic pump, a flow rate detecting valve disposed in a delivery line of said fixed displacement hydraulic pump, and an operation driver for modifying said first setting value ΔPLSref depending on a differential pressure ΔPp across said flow rate detecting valve, said flow rate detecting valve being constructed to have a larger opening are when the engine rotational speed is in the region including the rated rotational speed than when the engine rotational speed is in a region including the lowest rotational speed, and wherein said second setting modifying means includes control pressure chambers for modifying the second setting value Δpun of said unloading valve depending on the differential pressure ΔPp across said flow rate detecting valve.

5. A hydraulic drive system according to claim 2, wherein said first setting modifying means further comprises a first pressure control valve for generating a signal pressure corresponding to the differential pressure ΔPp across said flow rate detecting valve, said operation driver modifies said setting value ΔPLSref in accordance with the signal pressure from said first pressure control valve, and said control pressure chambers of said unloading valve modify said second setting value Δpun in accordance with the signal pressure from said first pressure control valve.

6. A hydraulic drive system according to claim 5, further comprising a second pressure control valve for generating a signal pressure corresponding to the differential pressure ΔPLS between the delivery pressure Ps of said hydraulic pump and the maximum load pressure PLS among said plurality of actuators, wherein said unloading valve has a first control pressure chamber applying a hydraulic pressure force to act in the direction to open said unloading valve and a second control pressure chamber applying a hydraulic pressure force to act in the direction to close said unloading valve, the signal pressure output from said second pressure control valve being introduced to the first control pressure chamber, and the signal pressure output from said first pressure control valve being introduced to said second control pressure chamber.

* * * * *